US010557064B2

(12) United States Patent
Hammond et al.

(10) Patent No.: US 10,557,064 B2
(45) Date of Patent: Feb. 11, 2020

(54) ELECTRON BEAM CURABLE PRESSURE SENSITIVE ADHESIVE COMPRISING ACRYLIC POLYMER WITH BOUND VINYL GROUP

(71) Applicant: ASHLAND LICENSING AND INTELLECTUAL PROPERTY LLC, Dublin, OH (US)

(72) Inventors: Terry Emerson Hammond, Columbus, OH (US); Zhaohui Sun, Dublin, OH (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 102 days.

(21) Appl. No.: 15/536,973

(22) PCT Filed: Dec. 10, 2015

(86) PCT No.: PCT/US2015/064993
§ 371 (c)(1),
(2) Date: Jun. 16, 2017

(87) PCT Pub. No.: WO2016/100085
PCT Pub. Date: Jun. 23, 2016

(65) Prior Publication Data
US 2017/0362475 A1 Dec. 21, 2017

Related U.S. Application Data

(60) Provisional application No. 62/092,451, filed on Dec. 16, 2014.

(51) Int. Cl.
| | | |
|---|---|---|
| *C08F 2/46* | (2006.01) | |
| *C08G 61/04* | (2006.01) | |
| *C09J 133/06* | (2006.01) | |
| *B32B 7/12* | (2006.01) | |
| *B32B 7/06* | (2019.01) | |
| *C09J 5/06* | (2006.01) | |

(52) U.S. Cl.
CPC ............. *C09J 133/066* (2013.01); *B32B 7/06* (2013.01); *B32B 7/12* (2013.01); *C09J 5/06* (2013.01); *C09J 2205/31* (2013.01); *C09J 2433/00* (2013.01)

(58) Field of Classification Search
CPC ........ C09J 133/06; C09J 5/06; C09J 2205/31; C09J 7/0217; C09J 2433/00; C09J 175/16; C09J 5/00; C08G 18/755; C08G 18/62; C08G 2170/40; C08G 18/6229; C08G 18/6254; C08G 18/8175; B32B 7/12; B32B 7/06
USPC .................................................. 522/1; 520/1
See application file for complete search history.

(56) References Cited

U.S. PATENT DOCUMENTS

| | | | |
|---|---|---|---|
| 3,775,377 A * | 11/1973 | Kokawa ................ | C08F 299/06 430/284.1 |
| 5,194,455 A | 3/1993 | Massow et al. | |
| 5,462,797 A | 10/1995 | Williams et al. | |
| 8,796,492 B2 | 8/2014 | Saito et al. | |
| 9,475,968 B2 * | 10/2016 | Hammond ................ | C08F 8/30 |
| 9,546,305 B2 * | 1/2017 | Hammond ............. | C09J 133/08 |
| 2010/0255239 A1 * | 10/2010 | Hammond ................ | C08F 8/30 428/41.5 |
| 2011/0206924 A1 * | 8/2011 | Liu .......................... | C09J 7/26 428/317.7 |
| 2014/0290856 A1 * | 10/2014 | Hammond ............. | C09J 133/08 156/332 |

OTHER PUBLICATIONS

International Search Report, WO 2016/10085 Published on Jun. 23, 2016.

* cited by examiner

*Primary Examiner* — Jessica Whiteley
(74) *Attorney, Agent, or Firm* — William J. Davis; Nathalie Tietcheu

(57) ABSTRACT

The invention relates to a process for making e-Beam curable pressure sensitive adhesive compositions by derivatizing an acrylic polymer having one or more hydroxy groups or one or more acid groups with a derivatizing agent prepared from a hydroxy-functional acrylate monomer and a diisocyanate. The pressure sensitive adhesive can be effectively cured without a photoinitiator or reactive diluent. Also disclosed are e-Beam curable pressure sensitive adhesives made with the derivatizing agent and methods for adhering substrates with the pressure sensitive adhesive compositions.

13 Claims, No Drawings

ELECTRON BEAM CURABLE PRESSURE SENSITIVE ADHESIVE COMPRISING ACRYLIC POLYMER WITH BOUND VINYL GROUP

CROSS-REFERENCE TO RELATED APPLICATIONS

This application is the national stage entry of International Patent Application No. PCT/US2015/064993 filed on Dec. 10, 2015, which claims priority to U.S. Provisional Application No. 62/092,451 filed on Dec. 16, 2014, which are incorporated herein by reference in their entireties.

BACKGROUND OF THE INVENTION

Field of the Invention

The invention concerns electron beam ("e-Beam") curable pressure sensitive adhesives ("PSA") comprising a derivatized acrylic polymer having at least one vinyl group. The invention pertains to methods of curing such PSA with e-Beam and also methods for making the PSA comprising derivatizing an acrylic polymer with a derivatizing agent prepared from a diisocyanate and a hydroxy-functional acrylate monomer.

The Related Art

Radiation curable acrylic hot melt PSA offers a potentially attractive alternative to rubber based hot melt adhesives, as lightly crosslinked acrylic adhesives have premium peel and shear performance, as well as outstanding weathering and aging performance compared to rubber based adhesives. Commercially UV curable acrylic hot melt adhesives are available. However, the technology used for most UV curable acrylic hot melt adhesives would not be transferable to e-Beam cure. Typical technology currently available for UV curable acrylic hot melt adhesives uses a polymeric anchored photoinitiator, usually a benzophenone moiety. This would provide no benefit for e-Beam curing, as radicals are generated by the high energy of the electron beam, and no photoinitiators are required. E-Beam cure usually requires active double bonds to achieve crosslinking, and the standard commercial UV curable acrylic hot melt adhesives do not contain active double bonds. E-Beam cure is desirable for applications where traces of residual monomers and photoinitiators are undesirable. These applications are typically for products that involve human contact or consumption—i.e., medical adhesives and food packaging adhesives.

All parts and percentages set forth herein are on a weight-by-weight basis unless otherwise specified.

SUMMARY OF THE INVENTION

The invention pertains to a process to make an e-Beam curable PSA comprising a derivatized acrylic polymer having at least one reactive pendant acrylic vinyl group. The derivatized acrylic polymer is made by derivatizing an acrylic polymer with a derivatizing agent that comprises the reactive pendant acrylic vinyl group, such as an adduct prepared from a diisocyanate and a hydroxy-functional acrylate monomer. The acrylic polymer has one or more acid groups or one or more hydroxy groups which react with the derivatizing agent, such as an isocyanate group of the derivatizing agent, to form an amide or urethane linkage. This process generates an acrylate-functional acrylic polymer that can be cured by exposure to e-Beam, typically with small amounts, or no, additives, such as photoinitiators and/or reactive diluents. The PSA may further comprise other components, such as tackifiers, cross-linking agents, stabilizers, fillers, inhibitors, solvents, plasticizers, and the like, and combinations thereof.

The derivatizing agent is typically prepared from a diisocyanate comprising differential reactivity between the two isocyanate groups, such that the reaction with one equivalent of hydroxy-functional acrylate monomer yields primarily a monourethane and not a random distribution of monourethane, diurethane, and unreacted diisocyanate. By generating predominantly acrylated monourethane with little or no remaining diisocyanate, addition to the hydroxy-functional acrylic polymer will not cause significant molecular weight increase. The remaining isocyanate will simply add to the alcohol groups in the acrylic polymer, and generate an acrylate functional acrylic polymer. The acrylate-functionalized acrylic polymer is e-Beam curable without additives to facilitate or accomplish the cure, such as photoinitiators.

The PSA may be applied in methods of adhering materials. The methods comprise the steps of providing substrate materials for the PSA, applying the PSA to a surface of a substrate, e-Beam curing the adhesive and mating and adhering the substrate material to another substrate material, preferably with the application of pressure.

DETAILED DESCRIPTION OF THE INVENTION

The e-Beam curable PSA composition is made by a process comprising the steps of derivatizing an acrylic polymer with a derivatizing agent to provide pendant acrylic functionality and curing the derivatized acrylic polymer with exposure to e-Beam. The derivatizing agent is prepared from a hydroxy-functional acrylate monomer and a diisocyanate. The process may further comprise the step of combining the derivatized acrylic polymer with one or more other components, such as those selected form the group consisting of tackifiers, crosslinking agents, stabilizers, fillers, solvents, plasticizers and the like, and combinations thereof.

The step of combining includes mixing the derivatized acrylic polymers as well as the other material existing, in situ, with the polymer from others steps, such as the solvent used in the step of formulating the polymer and/or urethane resulting from the derivatizing agent formulation. In certain embodiments, the acrylic polymer is formed and derivatized in the presence of a solvent, such as ethyl acetate, and as such the PSA comprises a solution having the derivatized polymer and solvent with or without other components. Typically, the PSA will have little or no photoinitiator and/or reactive diluent. The PSA may comprise, consist essentially of or consist of the derivatized acrylic polymer, including the derivatized acrylic polymer in solution, and, optionally, the one or more other components. Further, the process for making the PSA may comprise, consist essentially of or consist of the steps of derivatizing the acrylic polymer, including derivatizing the acrylic polymer while in solution, for example with ethyl acetate; optionally, combining the acrylic polymer with the other components; and curing the PSA with exposure to an e-Beam.

The acrylic polymer generally has a molecular weight of about 40,000 to about 150,000 Daltons. In one non-limiting embodiment, the acrylic polymer has a molecular weight of about 40,000 to about 100,000 Daltons.

The acrylic polymer may typically be made from a monomer comprising a large percentage of a monomer that generates a low glass transition temperature (Tg) polymer. Such monomers include those selected from the group consisting of 2-ethylhexyl acrylate, iso-octyl acrylate, isodecyl acrylate, lauryl acrylate, n-butyl acrylate, and combinations thereof. The monomer of making the acrylic polymer may further comprise other monomers that modify the Tg of the resulted polymer, such as those selected from the group consisting of methyl acrylate, ethyl acrylate, methyl methacrylate, styrene, vinyl acetate and combinations thereof. For derivatization with isocyanate, at least one hydroxy-functional monomer and/or monomer having an acid group must be incorporated into the backbone of the acrylic polymer. Using the Fox equation, the calculated Tg of the acrylic polymer before derivatization and e-Beam cure should ideally be in the range of from about −35° C. to about −50° C., preferably from about −40° C. to about −45° C.

In embodiments wherein the acrylic polymer comprises hydroxy functionality, the hydroxy-functional monomers are polymerized and the hydroxyl groups are located on the acrylic polymer backbone. In order to distinguish from the hydroxy-functional monomer(s) of the derivatizing agent, which is the agent of hydroxy-functional monomer, the hydroxyl-functional monomer (s) used to make the acrylic polymer is named as a backbone hydroxy-functional monomer(s). The hydroxy-functional monomer of the derivatizng agent is named as a hydroxyl-functional acrylate monomer. The backbone hydroxy-functional monomers may be the same, or may be different from the hydroxy-functional acrylate monomers for making the e-Beam curable PSA.

As such, the acrylic polymer may comprise one or more, preferably one, backbone hydroxy functional monomers. Examples of the hydroxy-functional monomers, which may be incorporated into the backbone of the acrylic polymer, include: 2-hydroxyethyl acrylate, 2-hydroxyethyl methacrylate, 2-hydroxypropyl acrylate, 2-hydroxypropyl methacrylate, 4-hydroxybutyl acrylate and combinations thereof.

In embodiments, the acrylic polymer comprises one or more monomers comprising acid groups. The acid groups in the acrylic polymer are typically derived from polymerization of acid functional monomers. The acrylic polymer having acid groups may comprise monomers selected from the group consisting of acrylic acid, methacrylic acid and combinations thereof.

In addition, the acrylic polymer, whether having hydroxy functionality or acid groups, may further comprise other functional monomers to enhance adhesion properties. For example, those selected from the group consisting of maleic anhydride, glycidyl methacrylate, N-vinyl pyrrolidone, N-vinyl caprolactam, and acrylamide, and combinations thereof.

The derivatizing agent is prepared such that most, if not all, of the molecules in the adduct will generally comprise at least about one reactive isocyanate group, and in an embodiment most molecules in the derivatizing agent comprise one reactive isocyanate group. The isocyanate group is necessary to derivatize the acrylic polymer.

When the acrylic polymer comprises hydroxy functionality, the isocyanate group of the derivatizing agent reacts with the hydroxyl(s) in the acrylic polymer to form a urethane linkage, and this linkage attaches the acrylate double bond functionality of the derivatizing agent to the acrylic polymer. This attachment makes the acrylic polymer reactive to free radical polymerization reactions.

When the acrylic polymer comprises one or more acid groups, the isocyanate group of the derivatizing agent reacts with the acid group(s) in the acrylic polymer to attach the derivatizing agent to the acrylic polymer through a secondary amide linkage. This secondary amide linkage attaches the acrylate double bond functionality of the derivatizing agent to the acrylic polymer. This attachment makes the acrylic polymer reactive to free radical polymerization reactions.

The derivatizing agent is prepared from a diisocyanate and a hydroxy-functional acrylate monomer, which is the agent of hydroxy-functional monomer. The diisocyanate will generally comprise differential reactivity between the two isocyanate groups, such that only one isocyanate can be preferentially reacted with the hydroxy-functional acrylate monomer of the derivatizing agent, leaving the other isocyanate available for later reaction with the acrylic polymer. Isocyanates useful in the invention include isophorone diisocyanate, toluene diisocyanate and the like and combinations thereof.

The hydroxy-functional acrylate monomer in the derivatizing agent may be selected from the group consisting of 2-hydroxyethyl acrylate, 2-hydroxypropyl acrylate, 4-hydroxybutyl acrylate, 2-hydroxyethyl methacrylate, 2-hydroxypropyl methacrylate and combinations thereof. Specialty hydroxy-functional acrylates like caprolactone acrylate (SARTOMER® 495, available from the Sartomer Company, Inc., Exton, Pa.) or ACE™ hydroxyl acrylate monomers from Momentive Specialty Chemicals, Inc., Columbus, Ohio can also be used.

The ratio of hydroxy-functional acrylate monomer to diisocyanate in the derivatizing agent is typically greater than 1:1, such as greater than 1.1:1. In embodiments of the invention, the ratio of hydroxy-functional acrylate monomer to diisocyanate in the derivatizing agent is from about 1.1:1 to about 1.5:1, typically from about 1.1:1 to about 1.4:1, preferably from about 1.1:1 to about 1.35:1. Persons of ordinary skill in these arts, after reading this disclosure, will appreciate that all ranges and values for the ratio of hydroxy-functional acrylate monomer to diisocyanate in the derivatizing agent are contemplated.

At low ratios of hydroxy-functional acrylate monomer to diisocyanate, there is often diisocyanate still present in the derivatizing agent. If too much free diisocyanate is present in the derivatizing agent, then reaction of the diisocyanate with hydroxy group(s) or acid group(s) in the acrylic polymer causes a significant molecular weight increase that makes the polymer difficult or impossible to process, and may even cause gelation of the acrylic polymer. At ratios of hydroxy-functional acrylate monomer to diisocyanate in the derivatizing agent of greater than 1:1, there is a portion of the diisocyanate that reacts with two hydroxy-functional acrylate monomers in the derivatizing agent to become a diurethane. This species does not function as a derivatizing agent, but simply becomes a reactive diluent and difunctional crosslinking agent for the e-Beam cure of the polymer. Generation of the diurethane reactive diluent is unavoidable from the process of derivatization and the diurethane is not needed for cure of the adhesive.

The amount of derivatizing agent reacted with the acrylate polymer is relevant to the properties of the adhesive. If too little is reacted, the acrylate polymer will not crosslink sufficiently during e-Beam cure to give good properties. If too much is reacted, the acrylate polymers will over-crosslink during e-Beam cure, and properties may be compromised. In embodiments, the PSA composition should preferably comprise from about 1.0% to about 10.0% by weight solids of the derivatizing agent, preferably from about 2.0% to about 5.0% by weight solids of the derivatizing agent, such as from about 2.0% to about 3.0% by weight solids of the derivatizing agent based on weight of the solid acrylate polymer. Persons of ordinary skill in these arts, after reading this disclosure, will appreciate that all ranges and values for the amount of derivatizing agent are contemplated. The level of the derivatizing agent is a function of the molecular weight of the acrylic polymer. At low molecular weights, a higher degree of derivatization may be required, while at higher molecular weights, a lower degree of derivatization may be required.

The derivatized acrylic polymer is incorporated into e-Beam curable PSA compositions. The PSA compositions comprising the derivatized acrylic polymer may be a 100% solids composition for hot melt applications. Also, the PSA compositions may be in the form of a solution adhesive, including those having a solids content ranging from about 50% to about 80%, preferably about 60% to about 75%.

The PSA composition may also comprise one or more components. Typically, these further components are selected from the group consisting of tackifiers, crosslinking agents, stabilizers, fillers, solvents, plasticizers and the like. Combinations of these materials may be used. The amount and type of these further components may be a function of the intended application of the PSA. For example, PSA compositions for low surface energy substrates will usually comprise tackifiers for peel performance. For high shear applications, a crosslinking agent may be of importance. For applications where the adhesive may experience temperature extremes, stabilizers may be used in the formulations.

The use of tackifier is preferred if low surface energy adhesion is a desired property of the PSA. Particularly effective and compatible with the acrylate polymer are rosin esters, preferably hydrogenated rosin esters. For higher temperature applications, glycerol tris-rosinate (FORAL® 85 available from Pinova Inc., Brunswick, Ga., USA) and pentaerythritol tetra-rosinate (FORAL® 105 available from Pinova Inc.), and mixtures thereof are preferred. Other tackifiers that may be used include hydrocarbon $C_5$ and $C_9$ tackifiers, generally in amounts up to about 5% loading for acrylic compatibility. Overall loading of the tackifiers may range from about 10% to about 30%, and more typically about 15% to about 25%.

Crosslinking agents useful in the invention, which generally enhance crosslink density in the e-Beam cured PSA, include multifunctional acrylate species. By increasing the crosslink density, the cohesive properties of the PSA will improve, and shear performance should be enhanced. However, the selection and level of the crosslinking agent needs to be carefully determined. With the wrong type or level of multifunctional acrylate, the crosslink density can be much higher than desired, and peel performance will be greatly compromised. Multifunctional acrylates made from ethoxylated diols or triols are preferred cross linking agents, such as ethoxylated hexanediol diacrylate, ethoxylated trimethylolpropane triacrylate and the like and combinations thereof. Ethoxylated acrylates are generally more reactive than non-ethoxylated acrylates, in that the hydrogen atoms on the carbon next to the ether have been found to be labile and participate in the polymerization process. The e-Beam curable PSA compositions may comprise about 1% to about 5%, preferably about 2% to about 3%, crosslinking agent.

The PSA is cured by exposure to high energy e-Beam. Typically, a high energy e-Beam is accelerated onto the surface coated with the PSA which induces molecular decomposition that generates free radicals thereby initiating the reaction of the double bonds of the derivatized acrylic polymer and cross linking the acrylic polymers. With the correct amount of double bond attachment, the cross linking can be used to generate a PSA with good peel, tack and shear performance. Typically, the PSA requires no photoinitiator and/or reactive diluents to achieve effective cure. However, small amounts of reactive diluents may be added to the PSA to reduce viscosity or modify the polarity to improve wetout on novel substrates. In certain embodiments, the PSA may comprise up to 20% of added reactive diluents, preferably up to 10% of such added reactive diluents, such as about 1% to about 20% or about 1% to about 10%. Such added reactive diluent is separate from the diurethane discussed above which form unavoidably from the process of derivatization.

The amount of current and dosage required to effectively cure the PSA is a function of the nature of the PSA and the thickness of application. For typical applications and PSA thickness layers, the PSA is generally cured through e-Beam generated with a current of about 1 mA to about 25 mA, such as about 1 mA to about 15 mA, for example about 2 mA to about 10 mA at voltages of about 50 kV to about 300 kV, typically about 100 kV to about 150 kV, such as about 115 kV to about 130 kV. Thus, the e-Beam dosage of about 5 kGy to about 75 kGy, such as about 10 kGy to about 60 kGy, generally about 10 kGy to about 50 kGy is applied to effectively cure a typical layer of PSA. Higher voltages result in higher e-Beam dosage at depth.

The e-Beam curable PSA described herein may be used for adhering substrates. A typical method for application of the e-Beam curable PSA compositions comprises the steps of:

a. providing at least a first substrate and a second substrate each having one or more surfaces;
b. providing the PSA described herein;
c. applying the PSA to a surface of the first substrate to form an adhesive layer having an adhesive layer surface;
d. e-Beam curing the PSA onto the adhesive layer surface; and
e. mating the surface of the first substrate having the PSA with a surface of the second substrate to adhere the first substrate and the second substrate.

In embodiments, the PSA may be applied to surfaces of both the first substrate and second substrate. In addition, the PSA may be transfer coated, that is coated and cured on release liner, and then be used as a two-sided transfer tape.

The PSA may be applied at any thickness and achieve acceptable cure. For example, the PSA compositions may be applied to the substrate at thicknesses less than 1 mil, greater than or equal to 1 mil, like greater than or equal to 2 mils and such as greater than 3 mils. The PSA compositions may be applied in thicknesses of about 0.1 mil to about 5 mils, for example about 0.1 mil to about 1 mil, such as about 1 mils to about 5 mils. Also in the range of about 2 mils to about 5 mils, typically about 2.5 mils to about 5 mils, including about 3 mils to about 5 mils.

The PSA may be used with a wide variety of substrates. Typically, the substrate is selected from the group consisting of paper, aluminum foil, metalized films, coated films, printed films, co-extruded films, polyester films, polyolefin based films, white polyolefin based films, polyamide based films, copolymer films, films containing various polymer blends, and combinations thereof. Substrates such as Mylar, polypropylene, polyethylene, high density polyethylene and the like are particularly useful with e-Beam curable PSA described herein.

EXAMPLE 1

An acrylic polymer was made from n-butyl acrylate, methyl acrylate, acrylic acid, and 2-hydroxypropyl acrylate in ethyl acetate solvent using standard solution polymerization techniques. The acrylic polymer was made from 76% by weight of n-butyl acrylate, 20% by weight of methyl acrylate, 3% by weight of acrylic acid and 1% by weight of 2-hydroxypropyl acrylate. The calculated Tg of this acrylic polymer was −40.1° C.

A derivatizing agent was made from isophorone diisocyanate (IPDI) and 2-hydroxyethyl acrylate (HEA) by a careful reaction of 1 mole of IPDI with 1.35 moles of HEA. This reaction produced a mixture of mono-urethane and di-urethane. The mono-urethane is the active derivatizing agent, as it still contains one isocyanate group that attaches to the hydroxyl in the acrylic polymer described above. The di-urethane is not reactive with the acrylic polymer, but is available to participate in free radical reactions as a difunctional crosslinking agent.

The acrylic polymer in ethyl acetate solution was derivatized with the derivatizing agent described above by mixing the derivatizing agent and the polymer, and heating at 75° C. with dibutyltin dilaurate to catalyze the reaction of the isocyanate with the hydroxys in the polymer. The acrylic polymer was derivatized at three different levels of the derivatizing agent: 2.0% by weight, 2.4% by weight, and 2.8% by weight.

Two mil dried films on PET facestock comprising dried residues of the derivatized polymers in ethyl acetate solution were made using both direct application and transfer applications. In the direct application, the derivatized polymer in solution was applied onto a PET facestock using standard drawdown equipment, followed by periods of air and oven drying. In the transfer application method, derivatized polymer in solution was coated on siliconized release liner and the coated film on release liner was then transferred coated to a PET facestock.

The adhesive layer on the direct coated and transfer coated films were both cured in an e-Beam unit under different 3 different currents. The currents were: 2.2 mA, 5.8 mA, and 9.3 mA. These currents resulted in dosages of 10 kGy, 30 kGy, and 50 kGy, respectively. The applied voltage was 125 kV.

After curing, peel and shear testing on the coated films were performed. Pressure Sensitive Tape Council ("PSTC") test methods were employed for evaluation of adhesive performance, primarily PSTC Test Method #1 for peel strength and PSTC Test Method #7 for shear adhesion failure time. PSTC Test Method #1 and PSTC Test Method #7 are incorporated herein by reference in their entirety. The results are shown in Table 1 below. Note that the films are identified in column 1 of Table 1 by the amount of derivatizing agent (DA) reacted with the acrylic polymer and the method of application to the PET facestock, direct application (Direct) or transfer application (Transfer).

TABLE 1

| Film | e-Beam Dosage | 24 Hr 180° Peel on SS | 1" × 1" × 2 kg Shear SS |
| --- | --- | --- | --- |
| 2.0% DA - Direct | 10 kGy | 8.3 A/T/C | ND |
| 2.0% DA - Direct | 30 kGy | 5.2 A | 158 Hours |
| 2.0% DA - Direct | 50 kGy | 3.9 A | 685 Hours |
| 2.0% DA - Transfer | 10 kGy | 5.2 A | 7 Hours |
| 2.0% DA - Transfer | 30 kGy | 4.4 A | 36 Hours |
| 2.0% DA - Transfer | 50 kGy | 3.6 A | 40 Hours |
| 2.4% DA - Direct | 10 kGy | 7.0 AGH3 | ND |
| 2.4% DA - Direct | 30 kGy | 4.0 A | >810 Hours |
| 2.4% DA - Direct | 50 kGy | 3.4 A | 395 Hours |
| 2.4% DA - Transfer | 10 kGy | 5.4 A/T | 9 Hours |
| 2.4% DA - Transfer | 30 kGy | 4.0 A | 29 Hours |

TABLE 1-continued

| Film | e-Beam Dosage | 24 Hr 180° Peel on SS | 1" × 1" × 2 kg Shear SS |
| --- | --- | --- | --- |
| 2.4% DA - Transfer | 50 kGy | 3.5 A | 58 Hours |
| 2.8% DA - Direct | 30 kGy | 3.3 A | >810 Hours |
| 2.8% DA - Transfer | 30 kGy | 3.3 A | 58 Hours |

EXAMPLE 2

An acrylic polymer was made from 2-ethylhexyl acrylate, n-butyl acrylate, methyl acrylate, and acrylic acid in ethyl acetate solvent using standard solution polymerization techniques. The acrylic polymer was made from 57% by weight of 2-ethylhexyl acrylate, 23% by weight of n-butyl acrylate, 16% by weight of methyl acrylate, and 4% by weight of acrylic acid. The calculated Tg of this acrylic polymer was −45.6° C.

The same derivatizing agent in Example 1 was used. The acrylic polymer in ethyl acetate solution was derivatized by heating at 85° C. No catalyst was used for the reaction of the isocyanate containing the derivatizing agent with the acids in the polymer. The acrylic polymer was derivatized with 2.5% by weight of the derivatizing agent. During the reaction, bubbling was observed as the reaction of acid with isocyanate liberates carbon dioxide.

Two mil dried films on PET facestock comprising dried residues of the derivatized polymers in ethyl acetate solution were made using both direct application and transfer applications. In the direct application, the derivatized polymer in solution was applied onto a PET facestock using standard drawdown equipment, followed by periods of air and oven drying, followed by e-Beam cure. In the transfer application method, derivatized polymer in solution was coated on siliconized release liner, dried, and then e-Beam cured. The coated film on release liner was then transferred coated to a PET facestock for testing.

The adhesive layer on the transfer coated films was both cured in an e-Beam unit under different 3 different currents. The currents were: 2.2 mA, 5.8 mA, and 9.3 mA. These currents resulted in dosages of 10 kGy, 30 kGy, and 50 kGy, respectively. The applied voltage was 125 kV. For comparison, a direct coated film was also cured at 50 kGy.

After curing, peel and shear testing on the coated films were performed using the test methods referenced in Example 1. The results are shown in Table 2 below.

TABLE 2

| Film | e-Beam Dosage (125 kV accelerating voltage) | 24 Hr 180° Peel on SS | 1" × 1" × 2 kg Shear SS |
| --- | --- | --- | --- |
| 2-mil Transfer | 10 kGy | 3.4 AGH1 | 3.6 Hours |
| 2-mil Transfer | 30 kGy | 2.5 A | 19.0 Hours |
| 2-mil Transfer | 50 kGy | 2.3 A | 34.2 Hours |
| 2-mil Direct | 50 kGy | 3.9 AGH2 | 111 Hours |

The results set forth in Table 2 demonstrate that at 50 kGy, the peel strength of the transfer coat is lower than the peel strength of the direct coat, and the shear failure time for the transfer coat is also lower than for the direct coat. Without being bound to any theory, this data indicates that some silicone may be incorporated onto the surface of the films during transfer coating.

EXAMPLE 3 (Comparative)

An acrylic polymer having a composition similar to the acrylic polymer described in Example 1 was made from n-butyl acrylate, methyl acrylate, acrylic acid, and 2-hydroxypropyl acrylate in ethyl acetate solvent using standard solution polymerization techniques. This acrylic polymer, however, was not derivatized with a derivatizing agent. The comparative acrylic polymer was coated on a release liner using conventional methods at 2 mil dry thickness. This film was subjected to e-Beam irradiation with a 30 kGy dosage (5.8 mA, 125 kV). The resulting film was evaluated for peel and shear properties on stainless steel panels using the test methods referenced in Example 1. The peel failed cohesively at 3.3 lb/in and the 1"×1"×2 kg shear failure time was effectively zero, failing immediately after hanging the 2 kg weight. This data indicates that the derivatization agent is essential to achieving cure for acrylic polymers with the molecular weight in about the 40,000 to 100,000 g/mole range.

EXAMPLE 4 (Comparative)

A commercial UV curable PSA based on anchored benzophenone technology was evaluated for its ability to be e-Beam cured. The PSA was coated on release liner at 2 mil thickness. Some of the coated materials were cured using UV irradiation and others were cured with e-Beam irradiation. The materials coated with the PSA with no cure, curing with UV irradiation and curing with e-Beam irradiation were tested for peel and shear properties on stainless steel panels using the test methods referenced in Example 1. The results are set forth in Table 3.

TABLE 3

| Film | Cure/Dosage | 24 Hr Dwell/180° Peel on SS in lb/in | 1" × 1" × 2 kg Shear Failure Time |
|---|---|---|---|
| 2 mil UV PSA | No Cure | 3.72 Cohesive | 0.01 Hour |
| 2 mil UV PSA | UV Cure @ 60 mJ/cm² UVC | 5.03 Adhesive | 15.21 Hour |
| 2 mil UV PSA | e-Beam @ 30 kGy (5.8 mA, 125 kV) | 8.42 Cohesive | 0.05 Hour |

The data, especially the shear data, shows that the UV PSA does not effectively cure by e-Beam irradiation. There is some minor cure that is achieved with the e-Beam, considering peel was 3.72 lb for the sample that was not cured but was 8.42 lb for the sample exposed to e-Beam irradiation, however, the peel for both samples failed cohesively. The shear data indicates that the e-Beam cured film would not be a very effective adhesive with cohesive failure in about 3 minutes after hanging the 2 kg weight. The UV cure does provide a satisfactory adhesive, with the peel failing adhesively at about 5 lb and a reasonably long shear failure time.

What is claimed is:

1. A process for making an electron beam ("e-Beam") curable pressure sensitive adhesive ("PSA") comprising the steps of derivatizing an acrylic polymer having one or more hydroxy groups or one or more acid groups with a derivatizing agent prepared from a hydroxy-functional acrylate monomer and a diisocyanate and curing the PSA with exposure to an e-Beam,
wherein the acrylic polymer before derivatization has a glass transition temperature (Tg) ranged from about −35° C. to about −50° C.
wherein the PSA comprises no photoinitiator.

2. The process of claim 1, wherein the ratio of hydroxy-functional acrylate monomer to diisocyanate is greater than 1:1.

3. The process of claim 1, wherein the acrylic polymer has a molecular weight of about 40,000 to about 150,000 Daltons.

4. The process of claim 3, wherein the acrylic polymer has a molecular weight of about 40,000 to about 100,000 Daltons.

5. The process of claim 1, wherein the acrylic polymer is polymerized by a monomer selected from the group consisting of 2-ethylhexyl acrylate, iso-octyl acrylate, iso-decyl acrylate, lauryl acrylate, n-butyl acrylate and combinations thereof; and at least one backbone hydroxyl-functional monomer.

6. The process of claim 1, wherein the acrylic polymer is polymerized by a monomer selected from the group consisting of 2-ethylhexyl acrylate, iso-octyl acrylate, iso-decyl acrylate, lauryl acrylate, n-butyl acrylate and combinations thereof;
and one or more monomers having an acid group.

7. The process of claim 5, wherein the monomer further comprises other monomers selected from the group consisting of methyl acrylate, ethyl acrylate, methyl methacrylate, styrene, vinyl acetate and combinations thereof.

8. The process of claim 5, wherein the backbone hydroxy-functional monomer is selected from the group consisting of 2-hydroxyethyl acrylate, 2-hydroxyethyl methacrylate, 2-hydroxypropyl acrylate, 2-hydroxypropyl methacrylate, 4-hydroxybutyl acrylate and combinations thereof.

9. The process of claim 6, wherein the monomers having an acid group are selected from the group consisting of acrylic acid, methacrylic acid and combinations thereof.

10. The process of claim 5, wherein the monomer further comprises a functional monomer selected from the group consisting of maleic anhydride, glycidyl methacrylate, N-vinyl pyrrolidone, N-vinyl caprolactam, acrylamide and combinations thereof.

11. The process of claim 1, wherein the diisocyanate is selected from the group consisting of isophorone diisocyanate, toluene diisocyanate and combinations thereof.

12. The process of claim 1, wherein the hydroxy-functional acrylate monomer is selected from the group consisting of 2-hydroxyethyl acrylate, 2-hydroxypropyl acrylate, 4-hydroxybutyl acrylate, 2-hydroxyethyl methacrylate, 2-hydroxypropyl methacrylate, caprolactone acrylate, and combinations thereof.

13. The process of claim 1, wherein the amount of the derivatizing agent is varied from about 1% to about 10% by weight of solids based on the weight of solid acrylic polymer.

* * * * *